May 16, 1961 D. R. HERRIOTT 2,984,750
MODIFIED OPTICAL SYSTEM FOR OFF-AXIS FLYING-SPOT SCANNERS
Filed July 31, 1958

INVENTOR
D. R. HERRIOTT
BY
ATTORNEY

United States Patent Office 2,984,750
Patented May 16, 1961

2,984,750
MODIFIED OPTICAL SYSTEM FOR OFF-AXIS FLYING-SPOT SCANNERS

Donald R. Herriott, Morristown, N.J., assignor to Bell Telephone Laboratories, Incorporated, New York, N.Y., a corporation of New York Filed July 31, 1958, Ser. No. 752,339

12 Claims. (Cl. 250—220)

This invention relates to an optical system in general and, in particular, to an optical system, wherein the source of illumination varies in position relative to the remainder of the system.

In the television industry a well-recognized method of transmitting an image produced on a slide has been to scan the slide with a beam of light in a predetermined scanning pattern or raster and then collect the light transmitted through the slide for projection onto a photomultiplier tube which converts the optical signal into an electrical signal. This process is generally termed "flying-spot scanning." This same method can be adapted to the simultaneous transmission of a multiple of signals representing different colors of the original image. A specific method for doing this comprises first producing a number of color separation slides, which are merely black and while slides of the image taken with different filters before the camera lens and each representing the components of the object of a particular color, and then simultaneously scanning this multiple of color separation slides with light from the same source, the light from such source being focused by separate objective lenses onto each individual slide. The light transmitted by each slide is then collected by an optical condenser system individually associated therewith and directed onto a photomultiplier tube which converts the optical signal into an electric signal. It has been found, however, that variations of color balance over the received picture area resulted from this particular method. A significant contribution to such variations can be attributed to the relatively non-uniform illumination incident upon different areas of each of the slides due to the geometry of the optical system itself.

In data storage systems a similar optical system occurs in the so-called "flying-spot store" which, as shown, for example, in R. C. Davis et al. Patent No. 2,830,285, April 18, 1958, utilizes a cathode-ray tube to provide a spot of light which is then focused by means of separate objective lenses onto numerous photographic plates. Each plate has a "bit" of information associated with each discrete spot to which illumination from the flying-spot may be directed. This "bit" is either an opaque or transparent or translucent spot on the photographic plate. The amount of light which is transmitted or not transmitted through each spot on each plate is collected and directed by individual optical condensers onto associated photomultiplier tubes which convert the optical signals into electrical signals. Therefore, an electrical output of as many "bits" of information as there are channels will be produced for each discrete position that the flying-spot assumes. However, since the system is not perfect in that some light will get through the opaque spots on the photographic plates either directly therethrough or around the fringes of the spot, there will not simply be an "on" or "off" electrical output. Therefore, each channel must have a circuit associated therewith which decides whether the electrical output signal from the photomultiplier represents an "on" or "off" condition. It can be seen that the greater the variation in illumination entering each channel, the wider band of error there will be in the decision circuits.

It is therefore an object of this invention to provide an optical system which contains a plurality of optical channels all of which are responsive to the same illumination source and all of which have a uniform relative response regardless of the position of the illumination source within its predetermined boundaries.

As a general proposition, when the spot moves in its raster the light emanating therefrom reaches each of the optical channels with a different angle of incidence and at best there is only one location for the light spot in the raster for which the angle of incidence of light arriving at each channel will be the same. This occurs when the location of the spot on the raster is equidistant from all the optical channels. Further, the light entering any channel varies with the angle of incidence, the greater the angle of incidence the less illumination that the channel will receive from the spot. Therefore, each channel will receive varying amounts of illumination as the spot moves through its raster. In order to compensate for the variations in the ratio of light collected in each channel over the scanned area, a blade or mask is inserted in each optical channel in such a way as to block more and more illumination from entering the optical channel as the angle of incidence of illumination entering that channel becomes smaller and smaller. These blades may be of any material having an opacity differing from that of the media through which the balance of the illumination reaches the associated objective lens and are shaped in accordance with the geometry of the over-all system.

The above and other features of the applicant's invention will be considered in more detail in the following description taken in connection with the drawings wherein.

Figure 1:
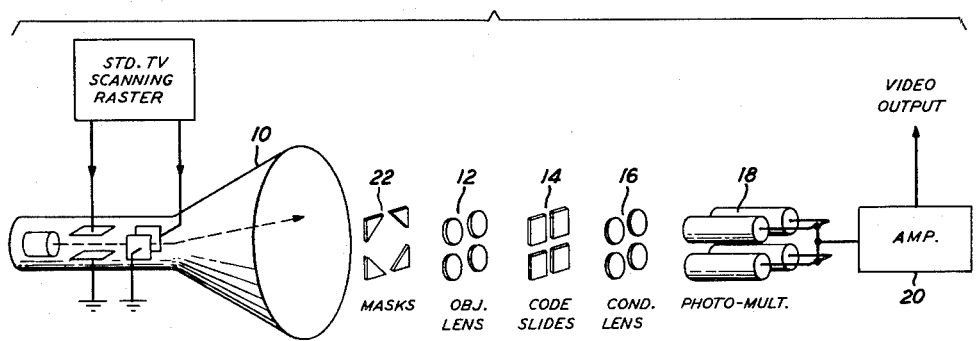
Fig. 1 is a perspective view of a flying-spot scanner system wherein four slides, which may be color separation slides or data slides, are scanned simultaneously.

Referring now specifically to Fig. 1 there is illustrated therein a cathode-ray tube 10 having equipment associated therewith which causes the cathode-ray beam to be swept over a selected area in a predetermined pattern or raster. The cathode-ray beam causes the phosphor coating of the tube face to emit illumination during that time and at the spot upon which the cathode-ray beam is focused. This results in a moving spot of illumination emanating from the face of the cathode-ray tube and traveling in a predetermined raster. Although the arrangement shown in Fig. 1 of the drawings is typical of that found in a four-color flying-spot television scanner, it is equally representative of the "flying-spot store" referred to above and differs therefrom only in the number of separate optical channels provided and in the fact that the spot moves randomly as required over the preselected area.

A plurality of objective lenses 12, in this case shown as four, image the illuminated spot, which will be referred to as the "flying-spot," on four color separation slides 14. The color separation slides are black and white slides of the original image taken with different filters before the camera lens and therefore each represents the intensity of one color of the original image. The light which is transmitted through each of the color separation slides 14 and which is representative of a particular color, is then collected by an associated condenser lens 16 and focused onto an associated photomultiplier tube 18 wherein the optical signal is converted into an electrical signal. All the electrical signals produced from the color collection channels are simultaneously amplified by amplifier 20 and transmitted to the video output circuits, indicated but not shown.

It is important that the ratio of intensity of light entering each optical channel remain constant over the raster area. If this is not so the received picture will have too little or too much of one color or the other. Since there are four color channels, there is a possibility of much error in relative color intensities of the received picture. Therefore, to combat this effect the applicant has placed a blade or mask 22 before the objective lens of each color channel as shown in Fig. 1. The blade does not have as its objective the maintenance of any specific level of intensity of light entering each color channel but merely the establishment of conditions such that the ratio of light entering each channel remains constant for each position of the flying-spot. The blades 22 need not be positioned before the objective lenses 12 and could, with appropriate adjustment of shape, also be positioned before the condenser lenses 16 if desired. The function of the blades 22 will become more apparent from the explanation of Fig. 2 which will follow.

In Fig. 1 the several blades 22, objective lenses 12, color separation slides 14, condenser lenses 16 and photomultiplier tubes 18 have all been shown to be coplanar within the groups of like elements. This is not a necessity but only the most straightforward and simple approach and it will become apparent that the applicant's invention is not limited to the coplanar arrangement.

Figure 2:
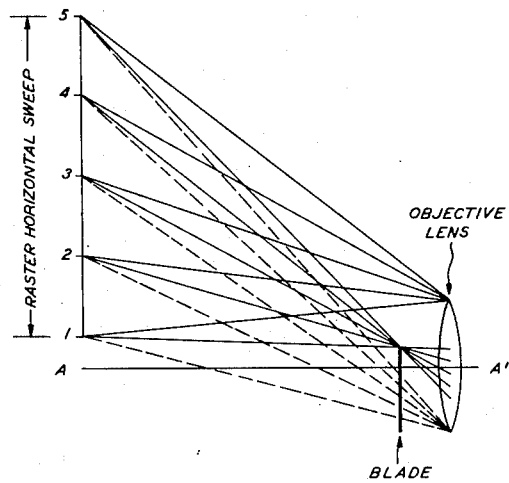
Fig. 2 is a simple diagram illustrating the effect of a fixed blade placed between a movable source of illumination and a fixed light collection system.

It should be apparent from Fig. 1 that at every spot in the raster except that spot which is equidistant from each objective lens and hence each optical color channel illumination from the flying-spot reaches each color or optical channel with a different angle of incidence. Fig. 2 is a simple diagram illustrating certain of the light rays entering the optical system of a hypothetical color channel through the objective lens of that channel. There are illustrated therein limiting rays for a light spot at five different points on one horizontal line of the raster. However, the significant effect and the explanation thereof will suffice for every point on the raster.

Each point has three lines emanating therefrom. The two lines, one solid and one dotted, forming the largest angle, describe the largest angle of light which could enter the optical channel if it were not for the blade illustrated. The two solid lines emanating from each point describe the angle of light which can enter the optical channel with the blade situated as shown.

It can be seen from Fig. 2 that as the spot moves along a horizontal line in the raster the total angle of light which can enter the system varies. Although many other factors also affect the total intensity of light which enters the optical channel, it is sufficient to say that the intensity of light entering the optical channel decreases the further off the principal axis A'—A' the light source moves. It can be seen from Fig. 2 that the blade cuts down or prevents more and more light from entering the optical channel the closer that the flying-spot comes to the center of the principal axis A'—A' thus providing a method of compensating for the opposing effect.

From Fig. 2 it could be inferred that the blade is opaque but this is not necessarily true. In order to get some selective attenuation of rays entering the channel closer to the principal axis A'—A' it is necessary only that the blade be more dense, or less capable of transmitting light, than its surrounding media.

Fig. 2 does not illustrate the exact shape that the blade would assume. This, however, must be determined by the exact system in which it is to be employed. Fig. 2 deals only with spot positions along a single horizontal line but it would be equally valid for spots on a vertical line and valid for every spot on the raster. Fig. 2 shows that as a general proposition and disregarding the blade, the further the flying-spot light source is away from the principal axis of the objective lens the less total intensity of illumination gets to the lens and hence the associated color channel.

In ordinary black and white television this above-described effect would occur but it would be tolerable since only a variation in intensity would occur. However, in a system such as that of Fig. 1, it can be seen that in the absence of the apparatus of the invention at only one spot on the raster will each color channel receive the same intensity of light. Depending upon the location of the light spot in its raster the greater or lesser will be the uniformity of illumination. But this can result in four errors of relative intensity which when recombined in the color receiver can make a sizable and objectionable difference in the reproduced color which will be much more apparent to the eye than an error in intensity only. As has been previously stated, the effect described above will also increase the band of error in the decision circuit of the flying-spot store system.

Figure 3:
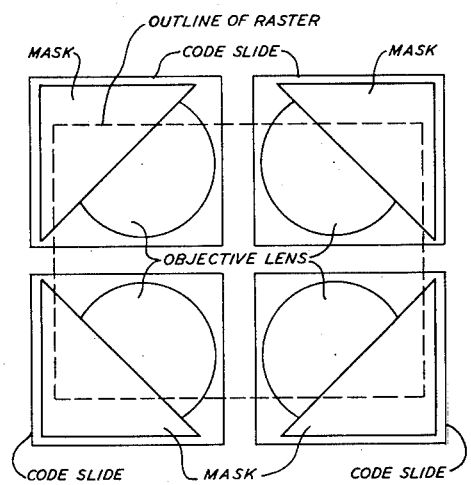
Fig. 3 is an illustration of the positioning of the blades in accordance with the invention in the flying-spot scanner of Fig. 1.

Fig. 3 illustrates how compensating masks or blades can be positioned in one particular four-channel system of the kind shown schematically in Fig. 1. There are shown therein objective lenses 12, slides 14 and blades 22. Each blade is triangular in shape and is positioned in front of its associated objective lens in the sector farthest away from the center of the raster. The blades or masks 22 are triangular in shape only because there is no need to extend them further in the direction of the two sides at right angles to each other. Only the hypotenuse edge of these blades is effective in modifying the light distribution. From Fig. 3 it can be seen that the closer the flying-spot light source comes to the axis of any lens the more the light coming from that spot is attenuated by the mask associated with that lens and the less the light going to the other lenses is attenuated by their associated masks. Since there were but four optical channels and because of the manner in which the lenses 12 were positioned with respect to the raster of the cathode-ray tube 10, the blades 22 are made triangular and positioned symmetrically as they appear in Fig. 3.

As has been stated the shape of the blades is determined from the system in which the arrangement according to the invention is to be used. The shape of the blades will be determined by the distance they are spaced from the associated lenses, the position with respect to the raster, the position and spacing of the other blades, the position of the associated lenses and the lenses associated with the remainder of the blades and so forth. What is important is to so shape and position the blades as to have uniformly shaped response curves of light intensity versus spot position for each optical channel. The magnitude of the curve is not important since this type of equalization can be done electrically by variable resistors for instance. Obviously, it is not practicable to specify the exact shape and position of every blade or mask used in every system and it is considered sufficient to point out what the functions of the blades are to be and what response is desired in aligning them with their associated optical channels.

What is claimed is:

1. In a flying-spot system, a cathode-ray tube, means for forming a spot source of illumination variable in position on the face of said tube, a plurality of optical channels each having associated therewith a slide having a predetermined light transmission value for each spot on said slide, a plurality of imaging lenses forming an array for imaging said spot source of illumination on said slides, a plurality of light sensitive devices associated with said channels for determining the transmitted illumination through said slides, and a fixed blade of lesser light transmission than its surrounding media associated with each imaging lens, each blade being interposed between only a portion of its associated imaging lens and said face of said tube and being arranged to have a larger portion of its surface interposed between said face of said tube and a portion of its associated lens which is further from the geometric center of said array of lenses than the portion of its associated lens which is nearer to the geometric center of said array.

2. The apparatus as defined in claim 1 wherein each of said blades is opaque.

3. In combination, a cathode-ray tube, means for forming a spot source of illumination variable in position on the face of said tube, a plurality of imaging lenses forming an array located in a fixed position relative to each other and the face of said tube, and a plurality of blades of a light transmission value less than the surrounding media associated with each imaging lens, said blades being located between said illumination source and said lenses, each blade being interposed between only a portion of its associated imaging lens and said illumination source and having more of its surface interposed between its associated lens and the region of said face of said tube that is furthest from the remainder of said lenses in said array than between its associated lens and the region of said face of said tube that is equidistant from the geometric center of said array.

4. In a flying-spot system, a spot source of illumination the position of which is variable in a fixed plane, said spot source being formed on the face of a cathode-ray tube, a plurality of optical channels, a plurality of imaging lenses forming an array associated with said optical channels for imaging said spot into said optical channels, a slide associated with each channel having a location associated with each position said source assumes and having a predetermined light transmission value for each of said locations, a light transducer associated with each slide for determining the illumination transmitted through each location, and a blade of a light transmission value less than its surrounding media associated with each imaging lens, each blade being interposed between only a portion of its associated imaging lens and said face of said cathode ray tube and being arranged to have a larger portion of its surface interposed between said face of said cathode ray tube and a portion of its associated lens which is further from the geometric center of said array than the portion of its associated lens which is nearer to the geometric center of said array.

5. Apparatus as defined in claim 4 wherein each of said blades is opaque.

6. In combination, a cathode-ray tube forming a spot of illumination the position of which is variable on the face of said tube, a plurality of optical channels each having a slide associated therewith having a location corresponding to every position said source assumes and having a predetermined light transmission value for each location, an imaging lens associated with each channel for imaging said source onto its associated location on said slides, a photomultiplier tube associated with each channel for measuring the illumination transmitted through its associated slide at each location, and a mask having a light transmission value less than its surrounding media associated with each imaging lens located between said illumination source and said lenses and arranged to attenuate rays arriving at said lenses, each mask being interposed between only a portion of its associated imaging lens and said illumination source and having more of its surface interposed between its associated lens and the region of said face of said cathode ray tube that is furthest from the remainder of said lenses than between its associated lens and the region of said face of said cathode ray tube that is equidistant from all of said lenses.

7. Apparatus as defined in claim 6 wherein each of said blades is opaque.

8. In an optical system, the combination of a point source of illumination variable in position in a fixed plane, a plurality of imaging lenses located in a fixed position relative to each other and to said plane, and a blade of lesser light transmission than its surrounding media associated with each imaging lens, each blade being interposed between only a portion of its associated imaging lens and said fixed plane and being arranged to have a larger portion of its surface interposed between said fixed plane and a portion of its associated lens which is further from the geometric center of said plurality of imaging lenses than the portion of its associated lens which is nearer to the geometric center of said plurality of imaging lenses.

9. In an optical system, a point source of illumination variable in position over a fixed plane, a plurality of imaging lenses located in a fixed position relative to each other and said fixed plane, and a fixed opaque blade associated with each lens, each blade being interposed between only a portion of its associated lens and the region of said fixed plane and having more of its surface interposed between its associated lens and the region of said fixed plane that is furthest from the remainder of said lenses than between its associated lens and the region of said fixed plane that is equidistant from all the lenses.

10. In an optical system, the combination of a point source of illumination variable in a fixed plane, a plurality of coplanar lenses located in a fixed position relative to each other, and an opaque blade for each imaging lens, each blade being interposed between only a portion of the associated imaging lens and said fixed plane and being arranged to have a larger portion of its surface interposed between said fixed plane and a portion of its associated lens which is further from the geometric center of said coplanar lenses than the portion of its associated lens which is nearer to the geometric center of said coplanar lenses.

11. In an optical system, a point source of illumination variable in position in a predetermined raster, a plurality of coplanar imaging lenses located in a fixed position relative to each other and said raster, and a blade of a light transmission value less than its surrounding media associated with each imaging lens located between said illumination source and said lenses, each blade being interposed between only a portion of its associated imaging lens and said raster and being arranged to have a larger portion of its surface interposed between said raster and a portion of its associated lens which is further from the geometric center of said plurality of coplanar imaging lenses than the portion of its associated lens which is nearer to the geometric center of said plurality of coplanar imaging lenses.

12. In combination, a spot source of illumination variable in position in a fixed plane, a plurality of coplanar imaging lenses located in a fixed position relative to each other and in a plane parallel to said plane containing said source, and a plurality of opaque blades one for each imaging lens, said blades being located between said source and said lenses, each blade being interposed between only a portion of the associated lens and said fixed plane and having more of its surface interposed between its associated lens and the region of said fixed plane that is furthest from the remainder of said lenses than between its associated lens and the region of said fixed plane that is equidistant from the geometric center of said plurality of coplanar imaging lenses.

References Cited in the file of this patent

UNITED STATES PATENTS

| | | |
|---|---|---|
| 2,183,717 | Keall | Dec. 19, 1939 |
| 2,199,066 | Bernstein | Apr. 30, 1940 |
| 2,415,191 | Rajchman | Feb. 4, 1947 |
| 2,654,027 | Baum | Sept. 29, 1953 |
| 2,703,150 | Rieber | Mar. 1, 1955 |
| 2,830,285 | Davis et al. | Apr. 8, 1958 |
| 2,903,582 | Horgan | Sept. 8, 1959 |
| 2,903,598 | Hoover | Sept. 8, 1959 |